United States Patent [19]

Chen

[11] Patent Number: 5,003,589
[45] Date of Patent: Mar. 26, 1991

[54] HEADPHONE-CONVERTIBLE TELEPHONE HANDSET

[76] Inventor: Ping-Huang Chen, 4F No. 10, Alley 10, Lane 44, Hsin-I Rd., Taipei, Taiwan

[21] Appl. No.: 359,965

[22] Filed: Jun. 1, 1989

[51] Int. Cl.$^5$ .......................... H04M 1/03; H04M 1/05
[52] U.S. Cl. .................................. 379/433; D14/248; 379/430; 381/169; 381/183; 381/187
[58] Field of Search ................ 379/433, 430; 381/183, 381/187, 169; D14/248, 249, 206

[56] References Cited

U.S. PATENT DOCUMENTS

| | | | |
|---|---|---|---|
| 2,503,846 | 4/1950 | Shann | 379/430 |
| 2,879,343 | 3/1959 | Finken | 379/430 |
| 4,754,484 | 6/1988 | Larkin et al. | 379/433 |
| 4,782,527 | 11/1988 | Williamson et al. | 379/433 |
| 4,821,318 | 4/1989 | Wu | 379/433 |

FOREIGN PATENT DOCUMENTS

| | | | |
|---|---|---|---|
| 1512798 | 5/1969 | Fed. Rep. of Germany | 379/433 |
| 2533783 | 3/1984 | France | 379/433 |
| 1139718 | 1/1969 | United Kingdom | 381/183 |

*Primary Examiner*—Jin F. Ng
*Assistant Examiner*—Danita R. Byrd

[57] ABSTRACT

A headphone-convertible telephone handset including primarily a handle and a receiver portion, the receiver portion having a first receiver disposed therein, said handle having a second receiver, a transmitter and two arch connecting strips, the two arch connecting strips being telescopically mounted in the handle, said second receiver being connected to one of the connecting strips, permitting the receiver portion to be associated with the handle, serving as a hand-held handset, or separated from the handle, serving as a headphone, the transmitter being extensible retracted in the handle to cooperate with the receiver portion for headphone use.

1 Claim, 4 Drawing Sheets

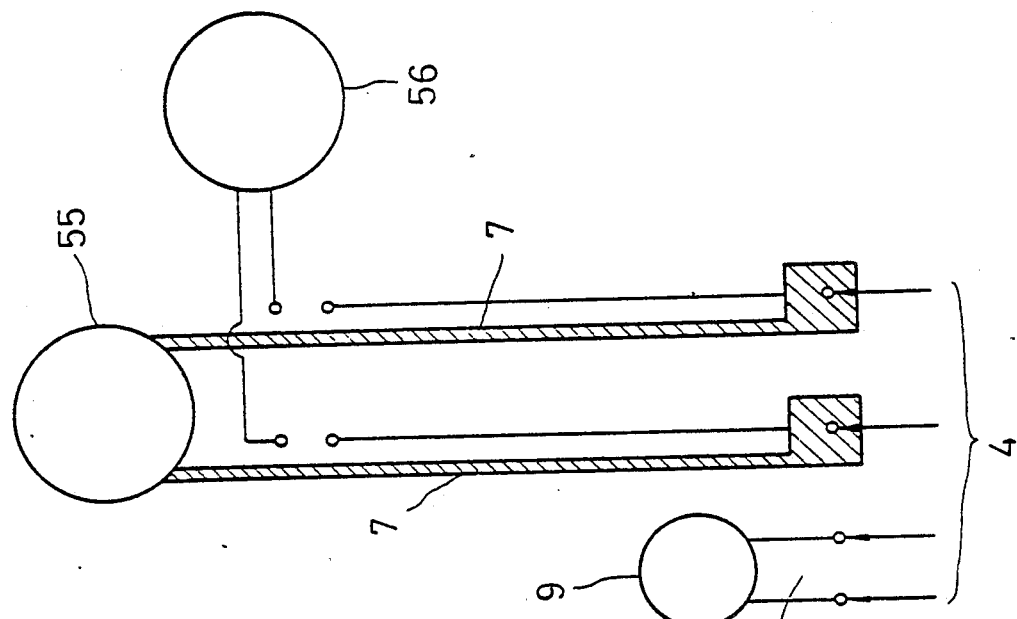
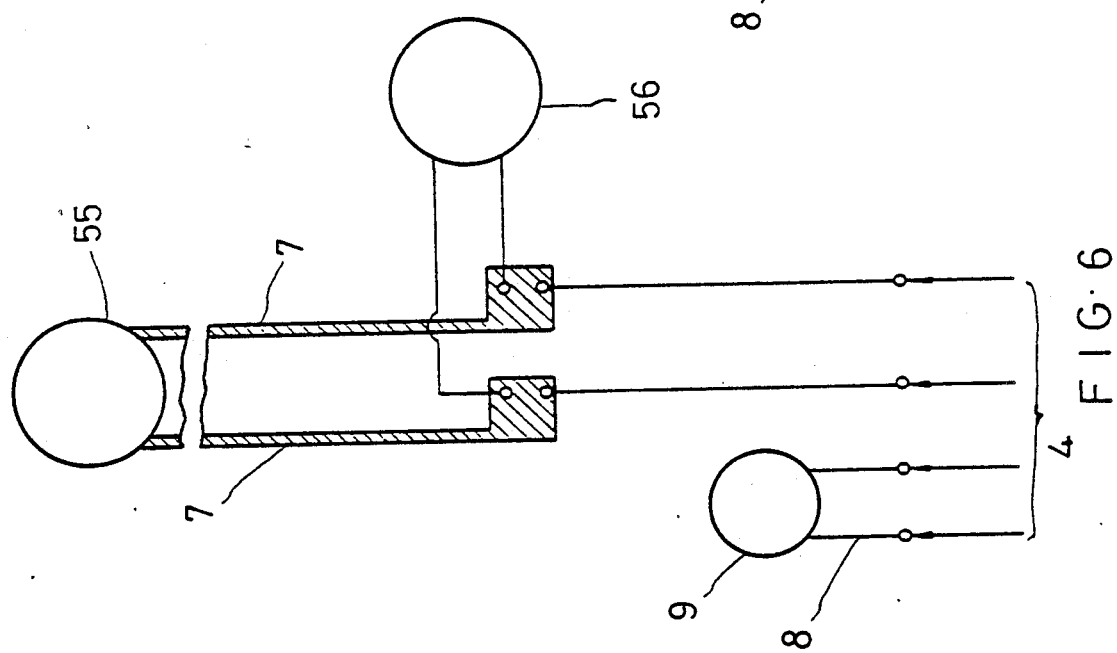

HEADPHONE-CONVERTIBLE TELEPHONE HANDSET

BACKGROUND OF THE INVENTION

The telephone is a major communication implement nowadays. Particularly, a wireless telephone can further enhance the space and range of telephone use.

Generally, the conventional telephone includes a handset that must be held by a user's hand. When the user's hand is occupied to do some other work, he/she always needs to clamp the handset between his/her shoulder and chin. This is inconvenient for the user. Furthermore, in a noisy situation, the user often shields his/her other ear from loudness with his/her free hand, and when the talk lasts a long time, the user feels exhausted.

SUMMARY OF THE INVENTION

It is therefore an object of the present invention to provide a headphone-convertible telephone handset including a handle, two receivers, a transmitter, two telescopic arch connecting strips and a metal hose, wherein one of the receivers is connected to the arch connecting strips, while the other receiver is fixedly mounted in the handle, the transmitter being disposed under the metal hose and capable of being retracted into the handle. The arch connecting strips can be extended, permitting the two receivers to respectively cover a user's two ears, while the metal hose together with the transmitter can be stretched outward to locate the transmitter right under the user's mouth for the convenience of speaking.

When used as a hand-held handset, the telescopic arch connecting strips are telescoped into the handle to associate two receivers together. In the mean time, the metal hose is also retracted into the handle. At this moment, the fixedly mounted receiver is disconnected from the telephone circuit and no more works.

The present invention is developed for those who are prevented from holding a telephone handset long due to some reasons, such as an operator, a driver, or a patient.

The present invention can be best understood through the following description and accompanying drawings wherein:

BRIEF DESCRIPTION OF THE DRAWINGS

FIG. 6 shows the circuit connection of the headphone; and

FIG. 7 shows the circuit connection of the handset.

DETAILED DESCRIPTION OF THE PREFERRED EMBODIMENT

Figure 1:
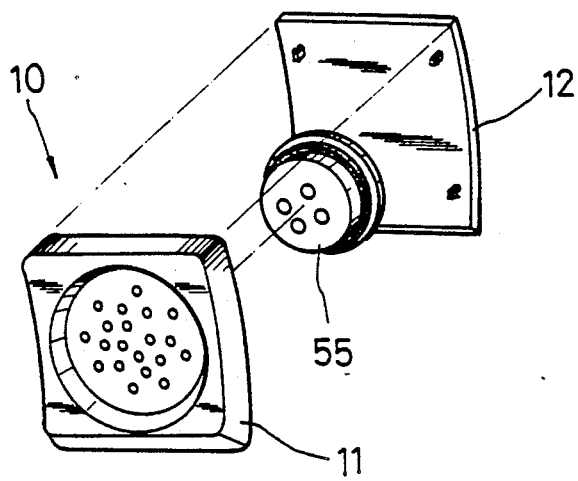
FIG. 1 is a exploded view of the present invention.
Figure 1:
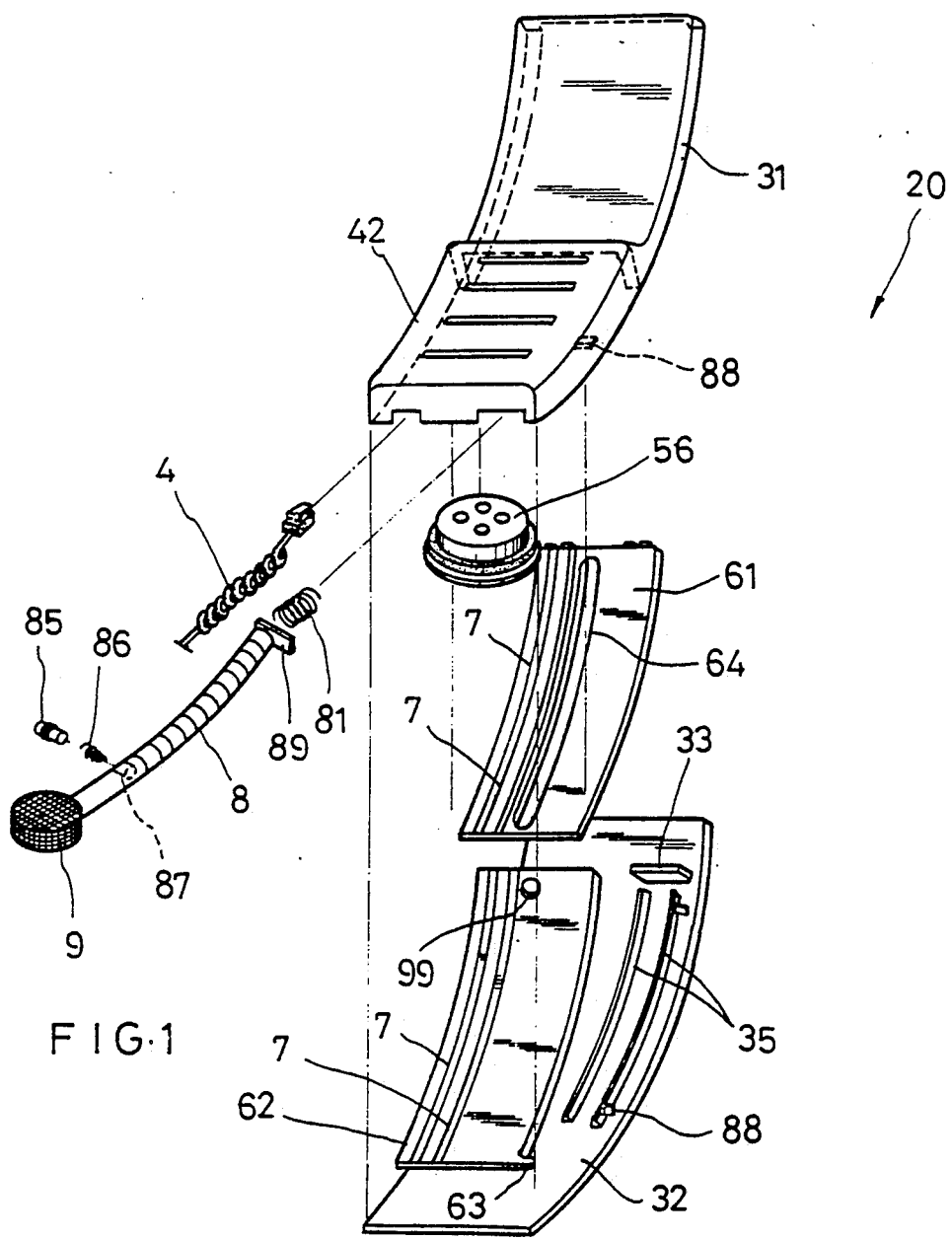
Figure 4:
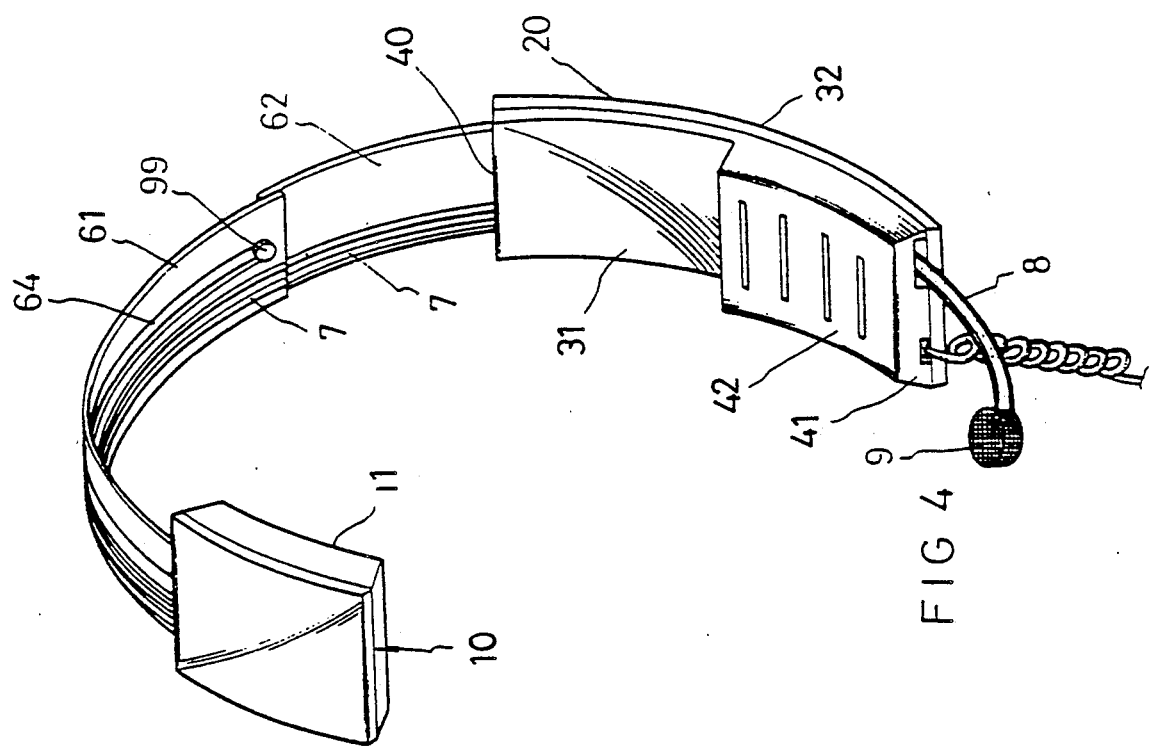
FIG. 4 is a perspective view of the present invention when used as a headphone.

Please refer to FIG. 1. The headphone-convertible telephone handset of the present invention includes a handle 20, and a receiver portion 10 extensibly mounted on the handle 20. The receiver portion 10 includes housings 11, 12, and a detachable receiver 55 contained therein. Housing 11 defines an earpiece. The handle 20 includes casings 31, 32, a fixed receiver 56, two arch connecting strips 61, 62, a transmitter 9, a conducting hose or tube 8, a spring 81, and a coiled telephone wire 4. Raised portion 42 on casing 31 forms a second earpiece. The conducting hose 8 has an upper soft portion and a lower hard portion, while the arch connecting strips 61, 62 are provided with two conductive strips 7 respectively. The strip 62 is further provided with a boss pin 99, while the strip 61 is provided with a long guide slot 64 within which the boss pin 99 can slide, permitting two connecting strips 61, 62 to perform telescopic movement. The connecting strip 62 has a projection 63 and the connecting strip 61 is mounted under the receiver 10 at its one end. Handle 20 has an open end 40 and a generally closed end 41. The two arcuate strips 61 and 62 are slidably engaged with each other and with interior surfaces of handle 20, such that the two arcuate strips can assume positions fully retracted into the handle, as shown on FIG. 5, or extended positions extending out of the open end of the handle, as shown in FIG. 4. In the FIG. 4 position earpiece 11 is spaced from handle 10; in the FIG. 5 position earpiece 11 is contiguous to the open end 40 of the handle.

The lower hard portion of the conducting tube 8 has a hole 87 in which a spring 86 and an extension latch pin 85 are located. The extension latch pin 85 normally extends slightly outside the hole 87 into engagement with projection.

The casing 32 of the handle 20 has a guide rail 35 slidably guiding the conducting hose 8. A plastic plate 33 is located at the end of the guide rail 35, in which the spring 81 is fitted. Additionally, a stopper 88 is located on the casing 31 to stop a projection plate 89 formed at the end of the conducting hose 8.

The fixed receiver 56 is fixedly mounted on the casing 32.

Figure 3:
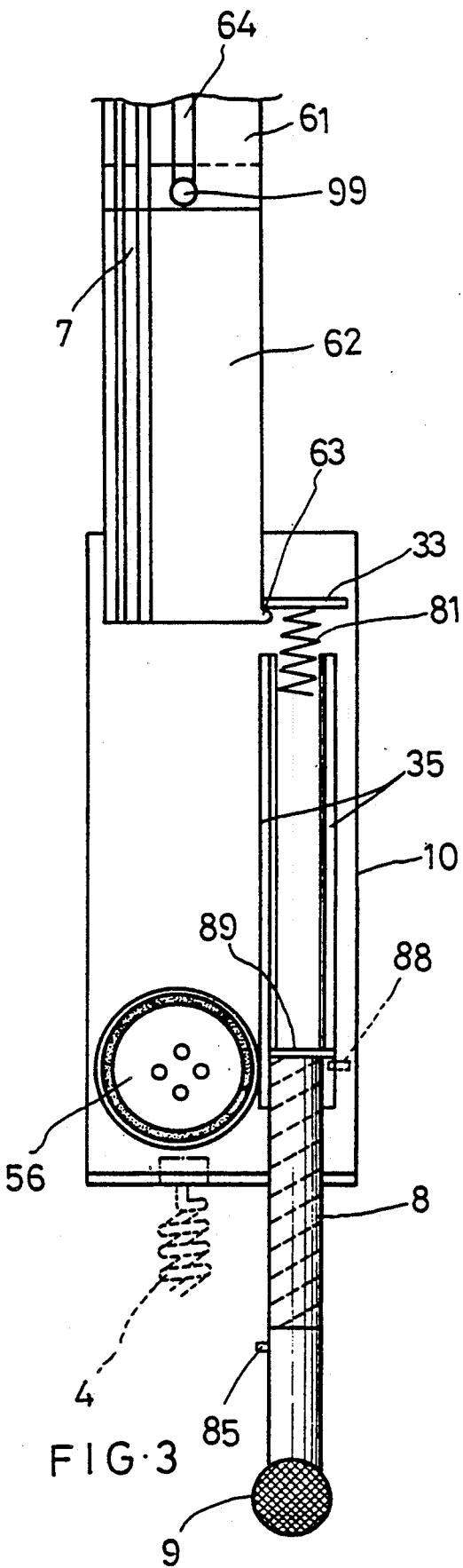
FIG. 3 shows the inner portion of the handle of the present invention when used as a headphone.

Please refer now to FIGS. 3 and 4. When pulling the receiver portion 10 outward to separate it from the handle 20, the connecting strips 61, 62 are extended outward and the extension pin 85 of the conducting hose 8 is retracted inward by the pulling force, applied to projection 63, whereby the conducting hose 8 is no more restricted, and is pushed outside the casings 31, 32 by the pushing force of the spring 81 to convert the handset into a headphone.

Figure 2:
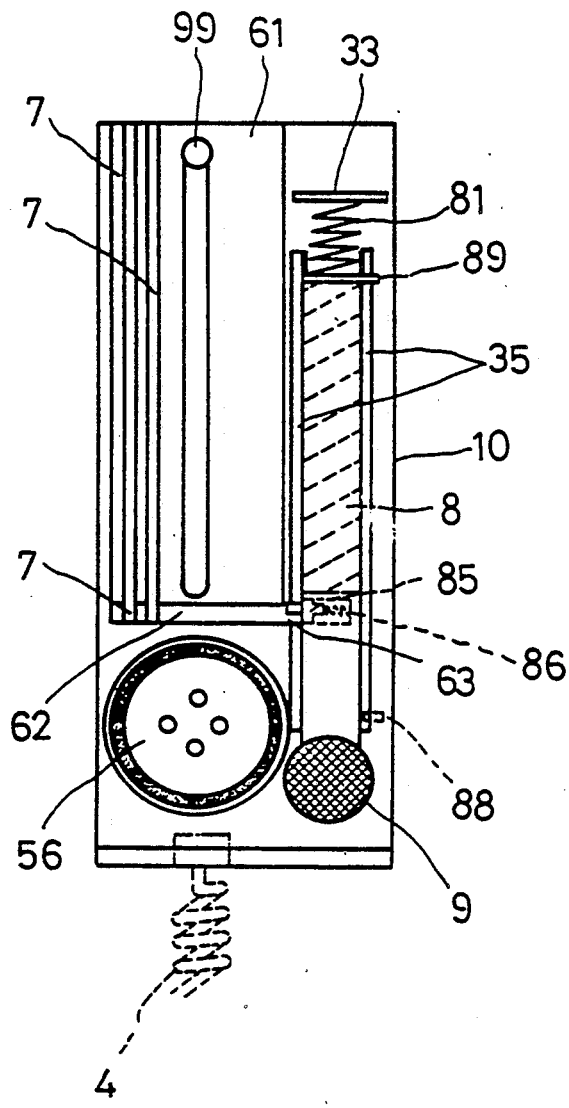
FIG. 2 shows the inner portion of the handle of the present invention when used as a handset.
Figure 5:
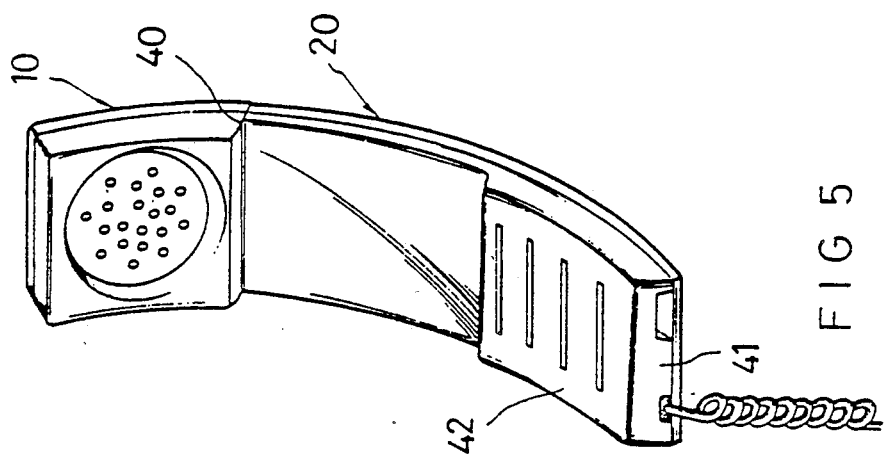
FIG. 5 is a perspective view of the present invention when used as a handset.

Please refer to FIGS. 2 and 5. When associating the receiver portion 10 with the handle 20, the conducting hose 8 is pushed inside the handle 20, and the projection pin 63 of the connecting strip 62 is restrictedly opposed against the extension pin 85 to therefore form a handset. When the components are in their retracted positions, as shown in FIG. 2, transmitter 9 is located within handle 20. When receiver portion 10 is pulled to move strips 61 and 62 to their extended positions, as shown in FIG. 5, the projecting pin 63 forces latch pin 85 into tube 8, thereby enabling spring 81 to move the tube and transmitter 9 to an extended position.

Please now refer to FIGS. 6 and 7 showing a circuit diagram. The transmitting line of the handset is connected to the transmitter 9 via coiled telephone wire 4 through conducting hose 8, while the receiving line is formed by connecting coiled telephone wire 4 to two metal connecting points and receiver 56 to another two metal connecting points. When separating the connecting strips 61, 62, the conductive strips 7 thereof contact four connecting points to electrically connect both the receivers 55, 56. When the connecting strips 61, 62 are retracted into the handle 20, the conductive strips 7 only contact two connecting points, i.e., only the detachable receiver 55 of the receiver portion 10 is electrically connected to function as a common handset.

I claim:

1. A telephone instrument that can be used either as a handset or as a headset; said instrument comprising an elongated arcuate hollow handle (20) having a first open end and a second essentially closed end; a first earpiece (42) located on said handle at its closed end; arcuate strip means (61, 62) slidably engaged with said handle for movement between a first position fully retracted into the handle and a second position extended out of the handle; a second earpiece (11) carried on said arcuate strip means for movement therewith whereby said second earpiece can assume a first position contiguous to the open end of the handle or a second position spaced away from the open end of the handle; a receiver (55) located within said second earpiece; an arcuate elongated tube (8) slidably mounted within the handle for movement through its closed end between a retracted position and an extended position; a transmitter (9) carried on said tube for disposition within the handle when the tube is in its retracted position; spring means (81) biasing said tube to its extended position; latch means (85) normally retaining said tube in its retracted position; and means (63) responsive to movement of said arcuate strip means from the fully retracted position for releasing said latch means so that the spring means can then move the tube and transmitter to the extended position.

* * * * *